Aug. 21, 1934. C. H. HAVILL 1,971,006
PROPELLER
Filed June 18, 1932
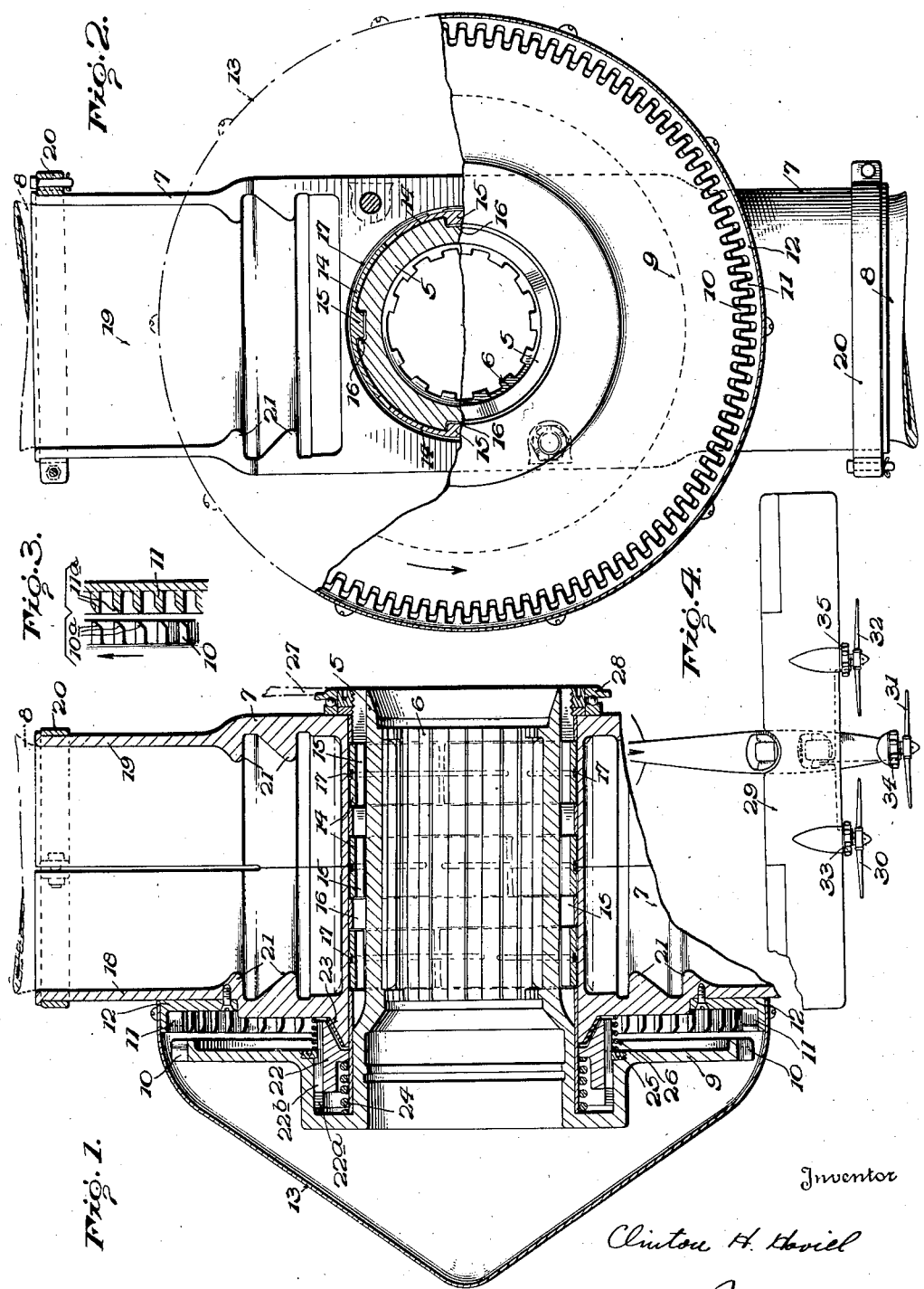

Patented Aug. 21, 1934

1,971,006

UNITED STATES PATENT OFFICE 1,971,006

PROPELLER

Clinton H. Havill, South Orange, N. J., assignor, by mesne assignments, to Eclipse Aviation Corporation, East Orange, N. J., a corporation of New Jersey Application June 18, 1932, Serial No. 618,055

18 Claims. (Cl. 170—177)

This invention relates to propellers and more particularly to propellers for use on aircraft of the type having a plurality of engines.

In the operation of aircraft and more particularly of aircraft of the type having a plurality of engines and propellers therefor, it is frequently necessary or desirable to stop one of the driving engines and its associated propeller, as, for example, in case of failure of one of the engines or when flying under light load conditions, in order to reduce fuel consumption. Under these conditions, the propeller which is stopped offers a considerable resistance to movement of the aircraft, either by remaining stationary, in which event it presents a considerable surface which must be forced through the air, or by acting as a windmill whose power is uselessly dissipated in turning over the engine associated therewith. Under such conditions, it has been found that the speed of the aircraft is noticeably decreased due to the resistance or drag offered by the particular propeller which is not being driven by its associated engine. Applicant has determined that a considerable amount of this wasted power could be saved if the propeller could be disconnected from its associated engine when the engine is not operating so as to function as a windmill turning under no load. Accordingly, it is one of the objects of the present invention to provide a novel propeller which is free to turn on its driving shaft when the latter is stationary.

Another object of the present invention is to provide a novel propeller in which the blades are automatically connected to the driving shaft when the latter is rotated.

Another object is to provide a novel propeller in which the blades and shaft are automatically connected upon rotation of the shaft and in which the blades and shaft may be manually connected at will.

Another object is to provide a novel propeller in which the hub is movable axially of the shaft in one direction to effect a driving connection between the hub and shaft and in the opposite direction to disrupt the connection.

Still another object is to provide a novel propeller in which a member is movable in response to the thrust of the blades to effect a driving connection between the hub and shaft.

A further object is to provide a novel propeller in which the hub and shaft are positively connected and in which the speeds of the hub and shaft are substantially synchronized before positive connection therebetween is effected.

Other objects and advantages will be apparent from the following detailed description when taken in connection with the accompanying drawing. It is to be expressly understood, however, that the accompanying drawing is for the purpose of illustration only and is not to be taken as a definition of the limits of the invention, reference being had for this purpose to the appended claims.

In the drawing, wherein like reference characters designate like parts throughout the several views:

Fig. 1 is a vertical sectional view of a propeller embodying the present invention;

Fig. 2 is an end view of the parts shown in Fig. 1 partially in section and partially in elevation;

Fig. 3 is a detail view of the toothed members shown in Figs. 1 and 2, and

Fig. 4 is a top plan view of an aircraft equipped with propellers embodying the present invention.

Referring particularly to Figs. 1 and 2, there is shown therein a propeller embodying the present invention constituted by a driving member or sleeve 5 adapted to be rigidly secured in any suitable manner to a driving shaft, not shown, as by means of splines 6, and a hub 7 loosely mounted on the sleeve 5 so as to be freely rotatable and axially movable with respect to the said sleeve and shaft, suitable propeller blades indicated schematically at 8 being secured in the hub 7. A gear member 9 having a series of teeth 10 around its periphery is formed integrally with or otherwise suitably secured to the driving sleeve 5 and the teeth 10 are designed to engage an annular series of teeth 11 on a member 12 secured to the hub 7 in any suitable manner to form a driving connection between the hub and the driving shaft. If desired, a suitable cover or nosepiece such as shown at 13 may be secured to the hub to protect the parts from dust, rain, etc. and to lower the wind resistance offered by the propeller.

Means are provided for frictionally engaging the hub 7 to turn the same with the shaft upon initiation of rotation of the latter. As shown, such means are constituted by weight members 14 having projecting portions 15 extending into longitudinally extending grooves 16 in the member 5 so as to be rotatable therewith, the weight members being held in place by resilient means such as light springs 17. When the driving shaft is stationary, weight members 14 are held out of contact with hub 7 by springs 17 but when the shaft is rotating the weight members are forced outwardly by centrifugal force against the action of the springs to frictionally engage the hub 7 and turn the same with the shaft.

In order to conveniently secure the blades in the hub, the hub 7 is preferably formed in two sections 18 and 19 suitably secured together as by rings 20, the hub sections being provided on their interiors with shoulders 21 adapted to engage similar shoulders formed on the blades.

Means are provided for substantially synchronizing the speeds of the hub and shaft prior to engagement of the teeth 10 and 11 so that these teeth may be easily engaged without clashing or any danger of breaking. As shown, such means are constituted by a friction clutch member 22 suitably connected to the driving sleeve 5 as by cooperating splines 22a and 22b, the member 22 having a conical surface adapted to frictionally engage a corresponding surface formed on the hub member 18. If desired, a suitable friction material or lining 23 of leather for example, may be secured to either of the conical surfaces, the lining, as shown, being attached to the surface formed on the hub. A suitable spring 24 is provided for normally urging member 22 toward the hub member 18 and an annular nut 25 threadedly connected to driving sleeve 5 engages a projection on the spline 22b on clutch member 22 to limit movement of the same in response to the expansion of spring 24. A second spring 26 may be provided between the hub 7 and nut 25 if desired, to urge the hub away from the clutch member 22 in order to normally maintain the clutch in disengaged position.

Referring to Fig. 3, there is shown therein a detail view of some of the teeth 10 and 11 and illustrating the formation of their adjacent sides. As shown, the teeth 10 are bevelled at 10a and the teeth 11 are bevelled at 11a, the bevels being so formed that when the teeth 10 are rotating in the direction of the arrow of Fig. 3, teeth 10 and 11 may readily move into mesh without danger of breaking off or otherwise mutilating the corners of the teeth.

In order that the propeller may be utilized as a flywheel in starting the associated engine, manual means are provided for effecting a connection between the hub and shaft. As shown, such means are constituted by a manually operable member 27 operable from the control panel or any other convenient place on the aircraft for moving the hub forwardly to effect engagement of the teeth 10 and 11. A suitable thrust bearing 28 is provided between the member 27 and hub 7, this bearing also serving to limit rearward movement of the hub to enable the latter to turn freely when in its rearward position.

Referring to Fig. 4, there is shown therein an aircraft 29 having a plurality of propellers 30, 31 and 32, each embodying the present invention and independently driven by engines 33, 34 and 35 respectively. If, during flight, one of the engines fails or is cut off by the operator to reduce fuel consumption, the wind pressure against the associated propeller together with the force of springs 24 and 26 forces the hub 7 rearwardly on the driving shaft, disconnecting teeth 10 and 11 and allowing the propeller to rotate freely as a windmill under no load, thus materially decreasing the wind resistance offered thereby. If the engine is then started again, rotation of the shaft causes weights 14 to fly out to frictionally engage hub 7 and turn the propeller with the shaft. When the propeller starts turning, it develops a thrust which forces the hub forwardly on the shaft against spring 26 and the clutch member 22 engages the hub 7 to substantially synchronize the speeds of the hub and shaft. As the thrust continues, the hub continues to move forward forcing the clutch member 22 forwardly against the spring 24 until the teeth 10 and 11 are brought into engagement to effect a positive driving connection between the hub and shaft.

It will be appreciated from the above that as long as the propeller is in operation, thereby exerting a thrust, the hub will be drivably connected with the driving member or shaft, but that upon a cessation of thrust, the springs 24 and 26 will effect a disconnection between the driving and driven members.

Thus there is provided by the present invention a novel propeller in which the hub and blades are disconnected from the driving shaft to rotate freely thereon when the driving shaft is stopped. The provision of the annular series of interengaging teeth results in an extremely strong construction capable of transmitting high torque and the friction clutch members enable these teeth to be engaged at substantially synchronous speeds without clashing or danger of breaking. The provision of the centrifugal clutch members enables the hub and shaft to be automatically coupled upon starting of the engine and the manual control provides a simple and efficient means for coupling the hub and shaft so that the propeller may be utilized as a flywheel in starting the engine.

While there is shown and described only one embodiment of the present invention, it will be understood that the same is capable of being embodied in various mechanical forms. Thus connecting means other than those shown and described might be employed or other changes occurring to those skilled in the art might be made without departing from the spirit and scope of the invention. Reference will therefore be had to the appended claims for a definition of the limits of the invention.

What is claimed is:

1. A propeller comprising a hub freely rotatably mounted on a driving shaft, blades carried by said hub, and means dependent upon axial movement of the hub with respect to the shaft and normally forming a driving connection between said shaft and hub only when driving torque is transmitted from said shaft to said hub.

2. A propeller comprising a hub freely rotatably mounted on a driving shaft, blades carried by said hub, and means operable to connect said shaft and hub when said shaft is rotating but normally ineffective when said shaft is stationary, said means including a centrifugally operable mechanism associated with said driving shaft.

3. A propeller comprising a hub movable axially of a driving shaft, said hub being normally disconnected from said shaft, blades carried by said hub, and means operative upon movement of said hub in one direction to connect said hub and shaft.

4. A propeller comprising a hub rotatable and movable axially with respect to a driving member, said hub being normally disconnected from said member, blades carried by said hub, and means operable in response to the axial thrust exerted by said blades for drivably connecting said hub and member.

5. A propeller comprising a hub rotatably mounted on a driving shaft, blades carried by said hub, and means responsive to centrifugal force for drivably connecting said hub and shaft.

6. A propeller comprising a hub rotatably mounted on a driving member, blades carried by said hub, centrifugal means responsive to rotation of said member for frictionally connecting said hub and member, means responsive to thrust-responsive movement of said hub relative to the member for positively connecting the latter and the hub, and means operable prior to the operation of said positive connecting means for synchronizing the speeds of said hub and member.

7. A propeller comprising a hub rotatably mounted on a driving shaft, blades carried by said hub, a toothed member mounted on said shaft, and a second toothed member mounted on said hub adapted to engage said first named toothed member to drivably connect said hub and shaft.

8. A propeller comprising a hub rotatable and axially movable with respect to a driving member, blades carried by said hub, a toothed member carried by said member, and a second toothed member on said hub adapted to engage said first toothed member upon axial movement of the hub in one direction to drivably connect the hub and member.

9. A propeller comprising a hub rotatable and axially movable with respect to a driving member, blades carried by said hub, a toothed member carried by said member, and a second toothed member on said hub adapted to engage said first toothed member to drivably connect the hub and shaft upon forward thrust-responsive movement of the hub on the member.

10. A propeller comprising a hub rotatable and axially movable on a driving member, blades carried by said hub, said hub being axially movable in response to the force exerted by said blades, a toothed member carried by said member, and a second toothed member on said hub adapted to engage said first toothed member to drivably connect the hub and member upon movement of said hub on said member in one direction.

11. A propeller comprising a hub rotatable and axially movable on a driving shaft, blades carried by said hub, a toothed member on said shaft, a second toothed member on said hub adapted to engage said first toothed member to drivably connect the hub and shaft, and means for substantially synchronizing the speeds of said hub and shaft prior to engagement of said toothed members.

12. A propeller comprising a hub rotatable and axially movable on a driving shaft, blades carried by said hub, a toothed member on said shaft, a second toothed member on said hub adapted to engage said first toothed member to drivably connect the hub and shaft upon forward axial movement of the hub on the shaft, and friction means associated with said hub and shaft adapted to be engaged by forward movement of the hub on the shaft to substantially synchronize the speeds of said hub and shaft prior to engagement of said toothed members.

13. A propeller comprising a hub rotatable and axially movable on a driving shaft, blades carried by said hub, centrifugal means to frictionally connect said hub and shaft upon rotation of said shaft whereby said blades will be rotated to produce an axial force to move said hub axially, and means operable upon axial movement of said hub to form a positive driving connection between said hub and shaft.

14. A propeller comprising a hub rotatably mounted on a driving shaft, blades carried by said hub, means operable to drivably connect said hub and shaft, automatically operable means to operate said first named means to connect said hub and shaft, and manual means operable independently of said automatically operable means to operate said first named means to connect said hub and shaft.

15. A propeller comprising a hub rotatable and axially movable on a driving shaft, blades carried by said hub, said hub being axially movable in response to the thrust of said blades, means operable on forward movement of said hub relatively to the shaft to drivably connect the hub and shaft, and manual means for moving said hub forward at will.

16. In an aircraft having a plurality of propellers and independent driving shafts therefor, a hub for each of said propellers and a driving connection between each of said hubs and its associated shaft, said connections being effective to transmit power from said shafts to said hubs but normally ineffective to transmit power from said hubs to said shafts, said connections embodying centrifugally operable devices.

17. In an aircraft having a plurality of propellers and independent driving shafts therefor, a hub for each of said propellers axially movable on said shafts respectively, propeller blades carried by each of said hubs, and means effective upon movement of a hub in response to the driving thrust of its associated blades to drivably connect the hub and its associated shaft, said hub being movable upon cessation of said driving thrust to disconnect the hub and its associated shaft whereby said hub and blades may turn freely on said shaft.

18. In a propeller having a driving shaft, a hub carrying a plurality of blades, said hub being normally drivably disconnected from said shaft and movable axially thereof in response to the thrust of the blades, and means operable during such axial movement of the hub with respect to the shaft for drivably connecting the hub and shaft.

CLINTON H. HAVILL.